Figure 8:
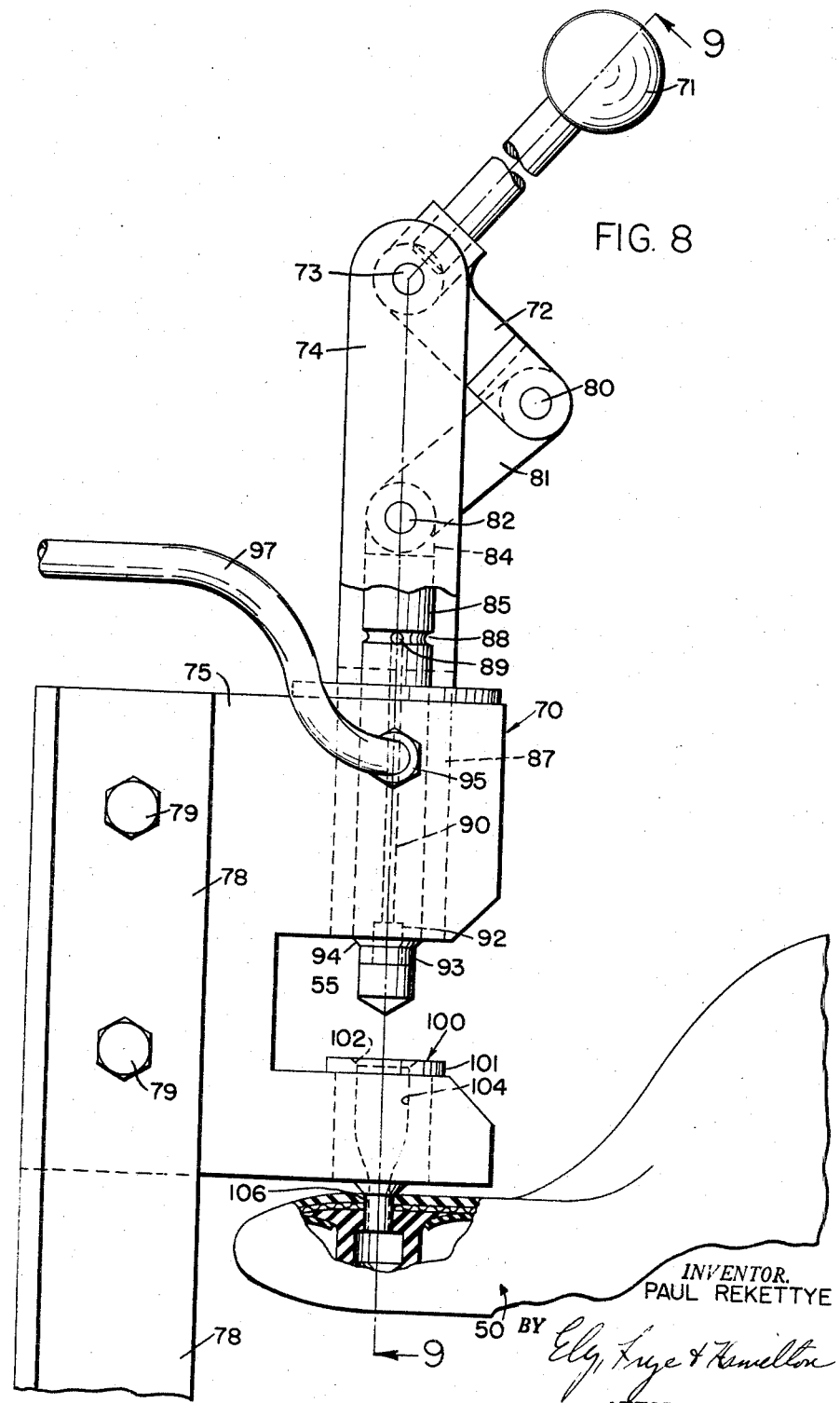

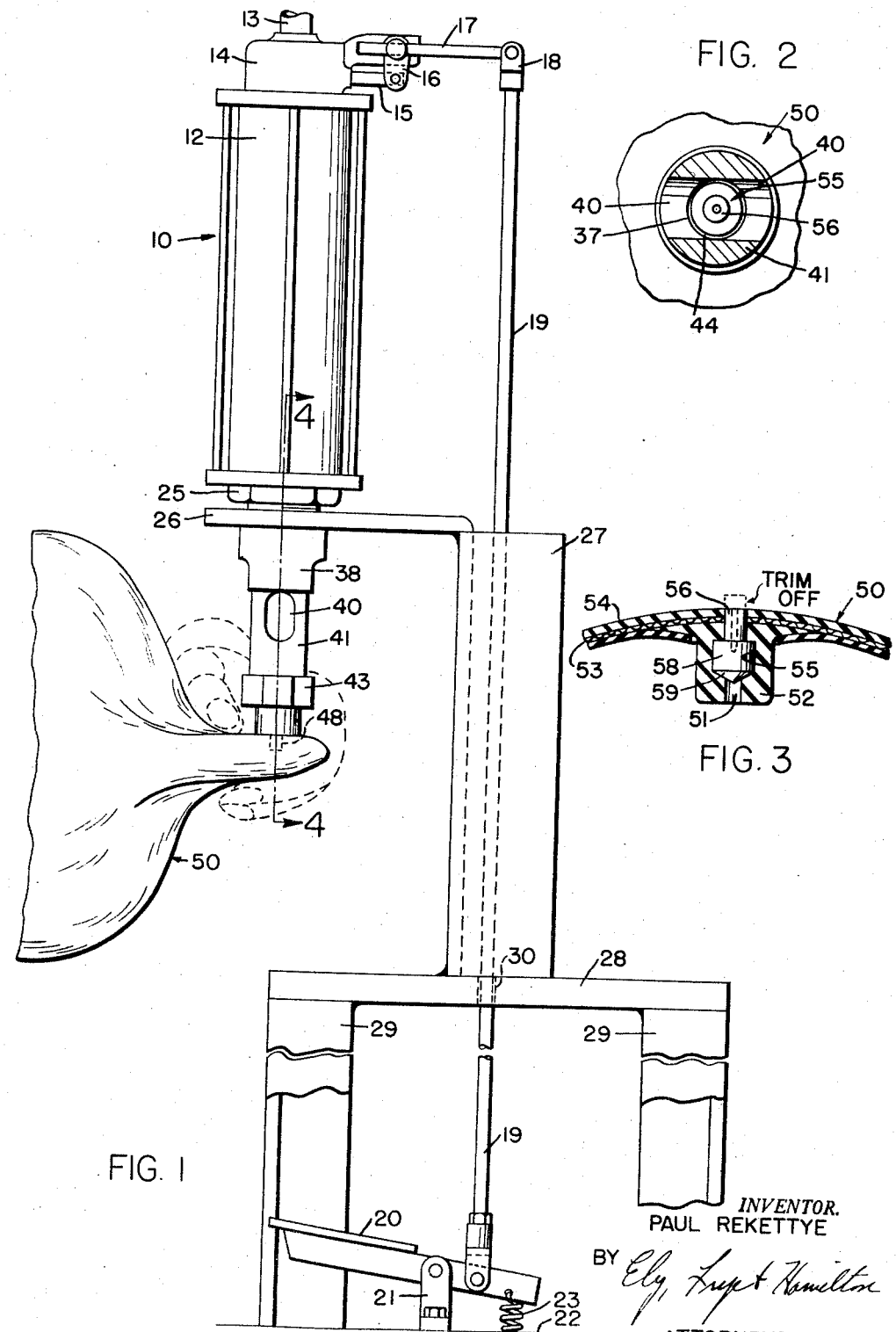

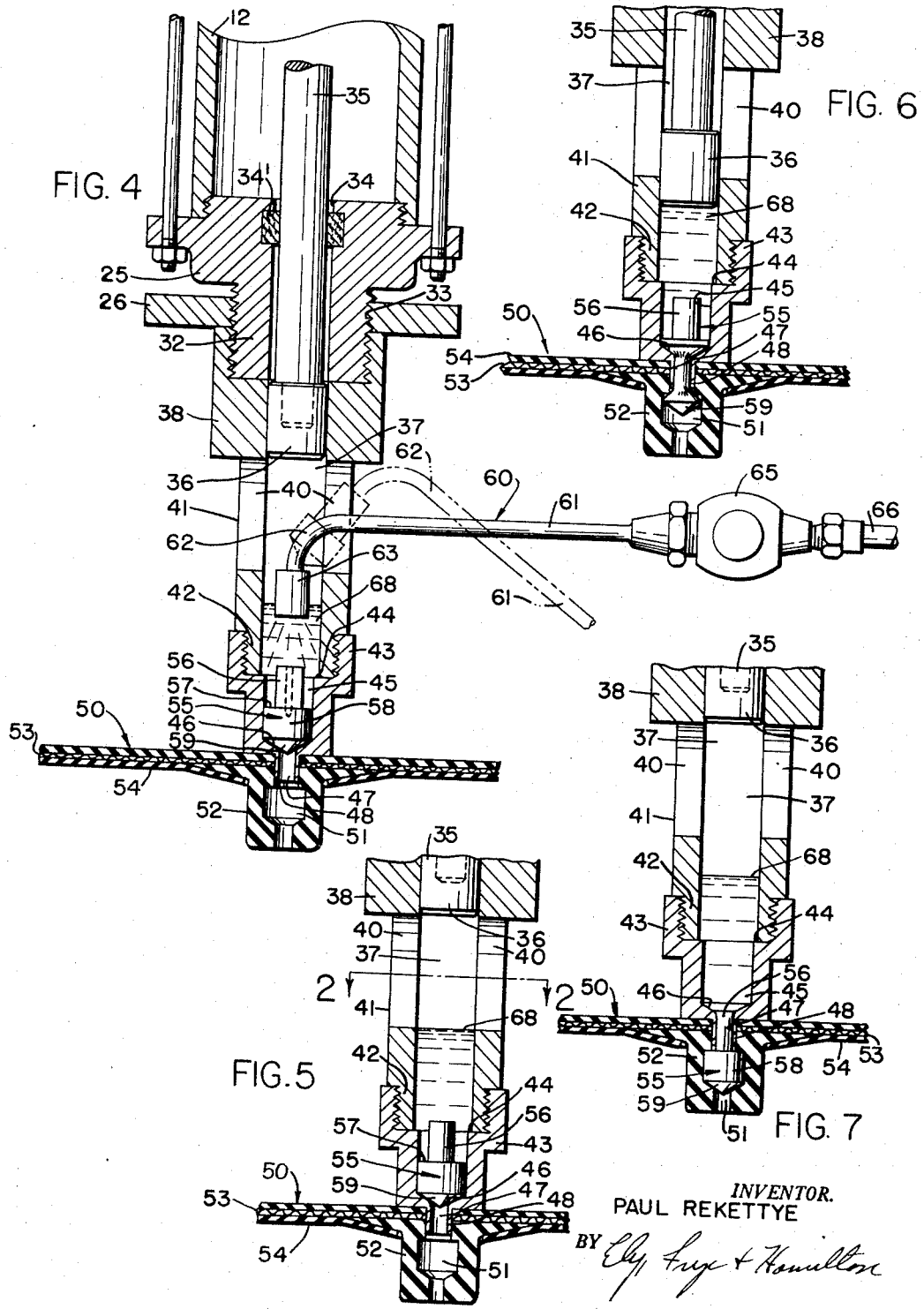

Oct. 21, 1958 — P. REKETTYE — 2,856,677
VALVE INSERTING APPARATUS
Filed Oct. 11, 1954 — 4 Sheets-Sheet 3

INVENTOR.
PAUL REKETTYE

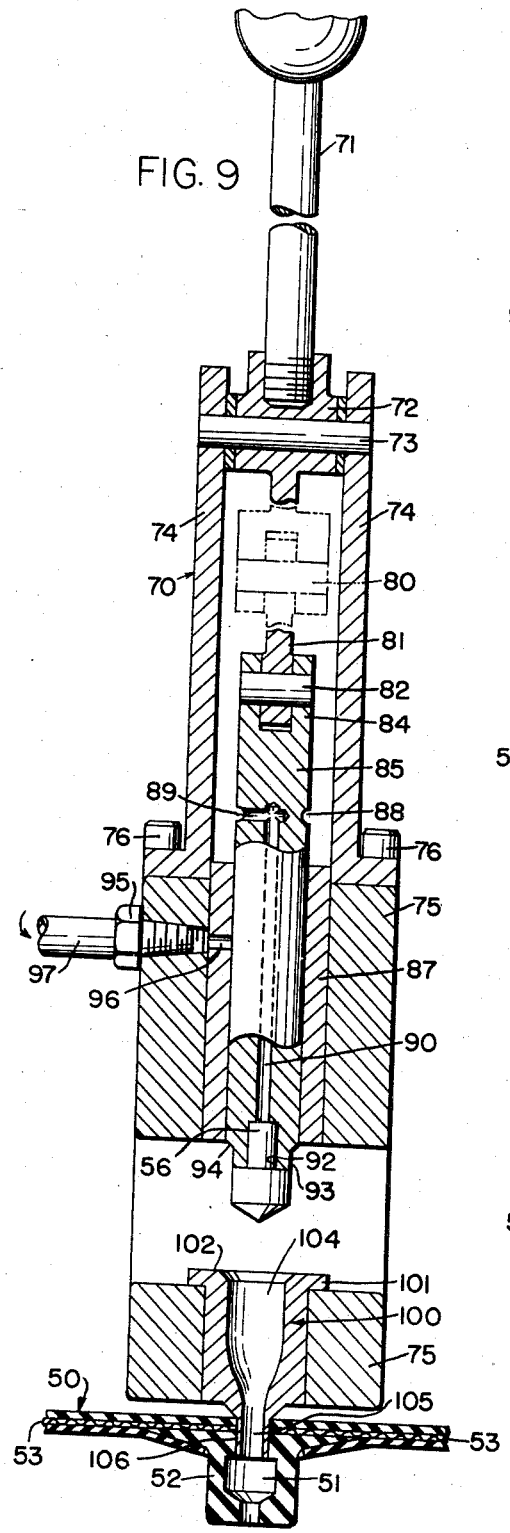

United States Patent Office 2,856,677
Patented Oct. 21, 1958

2,856,677

VALVE INSERTING APPARATUS

Paul Rekettye, Akron, Ohio, assignor to The Sun Rubber Company, Barberton, Ohio, a corporation of Ohio Application October 11, 1954, Serial No. 461,425

4 Claims. (Cl. 29—213)

The present invention relates to a valve inserting apparatus and a method of using same. More particularly, the invention relates to an apparatus for inserting a needle inflation valve into the valve insert cavity of hollow articles, especially basket balls, volley balls, footballs and the like.

The apparatus is intended to be used to insert a conventional needle inflation valve within a play ball which is of multi-ply, fabric and rubber, substantially non-distensible construction. Valves of this type may readily be inserted within rubber articles for the rubber is distensible and will stretch without tearing when the valve is manually inserted therein. However, the use of manual valve inserting techniques with a multi-ply, fabric and rubber ball, would result in a tearing of the several layers and thus would be entirely unsatisfactory.

Accordingly, it is an object of the present invention to provide a novel apparatus utilizing fluid or hydraulic pressure for inserting needle inflation valves within the valve insert cavity of hollow articles of multi-ply rubber and fabric construction.

Another object is to provide a novel apparatus which will insert a needle inflation valve without distending, stretching or tearing the several layers of a hollow article.

Still further, it is an object to provide a method of utilizing hydraulic pressure for inserting a needle inflation valve within the valve insert cavity of a hollow article.

Still further, it is an object to provide a novel apparatus which will perform the operation of inserting a needle inflation valve in an economical and efficient manner and without danger to the hands of the operator.

These and other objects will be readily apparent in view of the following detailed description, taken in conjunction with the attached drawings.

In the drawings:

Fig. 1 is an elevational view of one embodiment of a valve inserting apparatus, with a deflated ball in position for having a valve inserted therein, Fig. 2 is a plan view taken substantially on line 2—2 of Fig. 5, Fig 3 is a partial elevational view showing the valve within the valve insert cavity, Fig. 4 is an enlarged detail view taken substantially on line 4—4 of Fig. 1. A tool for loading valves into the apparatus is shown in both full and broken lines, Fig. 5 is a detailed view, similar to Fig. 4 showing a valve in position for insertion into the valve insert cavity of the ball, Fig. 6 is a detailed view, also similar to Fig. 4, showing the action of the apparatus when inserting the valve into the ball, Fig. 7 is a detailed view showing the valve inserted within the ball and the piston raised to its normal position, Fig. 8 is an elevational view, partly in section, of an alternative embodiment of the valve inserting apparatus, Fig. 9 is a detailed view taken substantially on line 9—9 of Fig. 8, Fig. 10 is a detailed view similar to Fig. 9, showing the operation of the apparatus when inserting the valve into the ball, and Fig. 11 is a detailed view showing the valve inserted within the valve insert cavity.

A valve such as inserted by either machine shown herein consists of an enlarged body of rubber which is housed in a chamber located in the wall of the ball and communicating with the exterior of the ball through a narrow passage. The problem is to insert the valve into the chamber through the narrow passage without injuring the wall of the passage, In the forms of the invention shown, this is done by forcing the valve through a narrow channel in register with the passage, the rubber of which the valve is formed being compressed through the channel in its passage into the chamber. It would be impossible to compress the valve by the application of a mechanical force. Both embodiments of the invention use hydraulic pressure exerted directly on the valve to force it through the channel and into the chamber.

In the embodiment of the invention shown in Figs. 1–7, inclusive, a charge of a non-compressible fluid such as water is placed in the tube above the valve, which is positioned by the receiving chamber so that when a rod or plunger is forced against the charge of water hydraulic pressure is exerted on the valve to force it out of the tube and into the valve insert cavity.

In the embodiment of the invention shown in Figs. 8–11, the hydraulic or fluid pressure means is introduced against the valve, positioned by the receiving chamber, through an axial bore in the rod so that the valve is forced from the tube and into the valve insert cavity.

Referring to the drawings, and Fig. 1 in particular, the valve inserting apparatus is indicated generally by the numeral 10. The apparatus includes a vertically mounted conventional cylinder 12 having a piston (not shown) which is preferably actuated by air supplied through inlet 13. The air supply is controlled by a conventional two-way valve 14, connected by rod 15 to pivot linkage 16 which is connected near its upper end to a second rod 17. A clevis thimble 18 is fastened to the rod 17 and a vertical rod 19. The vertical rod is connected at its lower end to a spring loaded foot pedal 20 mounted by bracket 21 to the floor or base plate 22. When the operator pushes downward with his foot on the pedal 20, the valve 14 is actuated by the described linkage to admit air and cause the piston rod of the cylinder 12 to be extended from within the cylinder. Release of the foot pedal causes spring 23 to return the pedal to its normal position and valve 14 is again actuated so as to admit air and cause the piston rod to be retracted within cylinder 12 to its normal position.

The cylinder 12 has a closure member or end piece 25 which is threaded into a horizontal cylinder support member 26 which is welded to a vertical support member 27. The member 27 is in turn welded to horizontal plate 28 which is supported by legs 29. The vertical rod 19 of the two-way valve actuating linkage passes through an opening 30 in plate 28.

Referring to Fig. 4, a threaded end 32 of the cylinder closure member 25 projects downwardly through a threaded opening 33 in the horizontal member 26. Projecting through the axial bore 34 and gasket 34′ from within the cylinder 12 is a modified piston rod 35 which is connected to a conventional piston (not shown) at the upper end, and has an enlarged plunger piston 36 affixed to the other end. The O. D. of the plunger end is in close tolerance with an axial bore 37 in a cylinder or tube member 38 which is threaded tightly onto the cylinder end 32. The plunger piston 36 connected to the piston rod is shown at its normal position in Figs. 2, 4 and 5.

Below the normal position of the end of plunger 36, the tube member 38 becomes reduced in diameter and valve loading slots 40 are provided, opening from either side into axial bore 37 for the convenience of right or left handed operators. The reduced diameter portion 41 of the tube terminates in a threaded end 42. Affixed to the threaded end of the tube is an adapter member 43.

The adapter has an axially located annular shoulder 44 which serves to provide a stop for the downward movement of the plunger 36 and also provides an axial bore 45, of reduced diameter or a valve receiving chamber 45, which accurately positions a valve which has been loaded into the apparatus. The chamber 45 has a frusto-conical portion 46 at the bottom thereof leading to a die-like orifice or opening 47 in an extension 48 of the adapter 43. The valve hole of a ball 50 is positioned around the extension 48 when the apparatus is being operated.

The hollow, non-distensible articles which are worked on in the practice of this invention are indicated generally by the numeral 50. The valve insert cavity 51 is contained within a rubber stem 52 and conforms generally to the shape of the valves inserted therein, although, preferably the cavity is slightly smaller than the valve so that when inserted, the valve will be tightly held by the valve stem. The ball itself is made up of multiple layers of finely woven fabric 53 and rubber 54 and could be covered with leather, if desired. Balls of this construction are non-distensible in the sense that an opening therein can be enlarged only slightly before the multilayers become torn or permanently distorted.

The valves, indicated generally by the numeral 55, are of a conventional needle inflation type and may be of rubber or other suitable material. They have a stem 56, a top surface 57, a body portion 58, and a conical point 59. The diameter of the body portion is referred to herein as the "largest diameter" of said valves.

To place a valve into the apparatus 10, a loading tool, indicated generally by the numeral 60, is used. This tool has a thin, hollow extension 61 which has a right angle bend 62 and terminates at one end in a thimble 63 which loosely holds stem 56 of the valve. The other end of the extension 61 is affixed to a conventional, push-button, control valve 65, which is connected to a water supply through pipe 66. To load the apparatus 10 with a valve 55, the operator places a valve stem 56 within a thimble 63 and inserts the end of the tool through one of the loading slots 40 into the axial bore 37. He then pushes the button on valve 65 and a charge of water 68, or other suitable non-compressible liquid, passes through the hollow extension forcing the valve downward into position within chamber 45, the conical portion 59 of the valve coming to rest within the die opening 47 as shown in Fig. 4. The valve 65 is preferably adjusted so that the charge of water is sufficient to fill the portion of axial bore 37 below the slots 40 and the chamber 45, with allowance being made for slight leakage through the die opening 47.

The operation of the apparatus 10 for inserting a valve 55 into a multi-ply ball 50 is as follows:

Referring to Fig. 1, the deflated ball is positioned beneath adapter 43 with the extension 48 extending part way into the valve cavity 51;

Referring to Figs. 4 and 5, the valve 55 is loaded within the apparatus 10 by insertion of the leading tool 60 into a loading slot 40 and forcing the valve downward through the axial bore 37 into the chamber 45 by the charge of water 68 which is added to the level of the bottom of loading slots 40;

Referring to Fig. 6, the piston rod 35 is then lowered by depressing foot pedal 20 and the plunger 36 exerts a pressure upon the column of liquid 68, which in turn causes the valve 55 to be forced from the receiving chamber 45 and through the die opening 47 in extension 48 into the valve seat 51 of the ball 50;

Referring to Fig. 7, the piston rod is retracted after contacting the shoulder 44 and returned to its normal position. Meanwhile, the valve 55 has expanded within the valve seat 51 nearly to its original shape;

Referring to Fig. 3, the ball is removed from the extension 48 and the top of stem 56 is trimmed flush with the outer surface of the ball;

Referring now to Fig. 8, an alternative embodiment of the valve inserting apparatus is indicated generally by the numeral 70. The apparatus includes a lever handle 71 which is rigidly affixed to a toggle link 72 rotatable on a pin 73 inserted between a pair of vertical housings 74. The housings are fastened to the top of C-shaped structural member 75 by means of bolts 76. The C-shaped member constitutes the basic structural unit of the apparatus 70 and is affixed to a support channel 78 by means of bolts 79.

The toggle link 72 is rotatably fastened by pin 80 to a single link 81 which is fastened by pin 82 to a clevis 84 at the upper end of a modified rod 85. The rod 85 moves up and down in, and is in close tolerance with a tube 87. The tube 87 is annular in shape and is contained within the C-shaped member 75.

Adjacent the upper end of the rod 85, at a point below the clevis 84, a horizontal groove 88 encircles the rod 85. Extending radially inwardly from the circular groove 88 is a passageway 89 which communicates with an axial bore 90. The axial bore runs lengthwise of the rod 85 to a point where it becomes enlarged so as to form a receiving chamber 92, of a diameter sufficient to snugly hold the stem 56 of a valve 55. The lower end 93 of the rod surrounding the receiving chamber is of reduced diameter and has a beveled surface 94, both for a purpose described hereinafter. Extending radially inward through the member 75 is a water inlet fitting 95. The threaded fitting 95 is aligned with an opening 96 in the wall of the tube 87 and serves to permit the entrance of water under pressure through line 97.

Positioned below the tube 87 and in such a manner as to exactly align with the collar 93 of the rod 85 is a die member 100. The die member is located within the lower section of the C-shaped member 75 and has a shoulder 101 which has a beveled surface 102 corresponding to the beveled surface 94 at the lower end of rod 85. The beveled surface 102 opens into an axial bore 104 which at its upper portion has a diameter similar to the diameter of the valve body portion 58. The lower end of the bore 104 becomes greatly lessened in diameter, leading to a die-like orifice or opening 105 in an extension 106 of the die member 100. The valve hole of a ball 50 is positioned around the extension 106 when the apparatus is being operated.

The operation of the apparatus 70 for inserting a valve 55 into a multi-ply ball 50 is as follows:

Referring to Fig. 8, the deflated ball is positioned beneath the member 75 with the extension 106 extending part way into the valve cavity 51; the valve 66 having been manually loaded in the apparatus 70 by insertion of the stem 56 into the valve receiving chamber 92;

Referring to Fig. 10, the handle 71 is actuated so as to cause the toggle linkage to lower the rod 85 so that the collar 93 and beveled surface 94 are closely engaged with the shoulder 101 and beveled surface 102 of the die member 100;

Referring to Figs. 10 and 11, when the rod 85 has seated against the die member 100, simultaneously therewith, the circular groove 88 will be in alignment with the bore 96 so that water, preferably under pressure of at least a 1000 p. s. i., will be admitted from line 97, through fitting 95 and passageways 96 and 89, into the axial bore 90. The hydraulic pressure exerted by the water causes the valve 55 to be forced from the receiving chamber 92, through the bore 104, and through the die opening 105 in extension 106 into the valve seat 51 of the ball 50;

The handle 71 is then actuated so as to raise the rod 85 which is returned to its normal position. Meanwhile, the valve 55 has expanded within the valve seat 51 nearly to its original shape.

The embodiment shown in Figs. 8-11 has an additional advantage in that it can be operated in a position other than vertical and therefore may be used for the insertion of valves in articles where it is difficult or impossible to locate the valve insert cavity substantially underneath the apparatus 70.

The present invention utilizes, in two different embodiments, hydraulic or fluid pressure to insert a needle inflation valve into the valve insert cavity of a non-distensible, multi-ply ball 50. The known techniques of valve insertion used for distensible rubber balls could never achieve this result. The use of hydraulic pressure exerted against the top surfaces of the valve permits a valve to be forced through the die opening of greatly lessened diameter and inserted into the ball, without damage to either the ball or the valve. The pressure serves to attenuate the rubber valve body so that it will pass through the small opening in the die and thence through the hole into the ball until it reaches the cavity, whereupon it will expand to fill the cavity. Mere mechanical pressure, even if exerted directly on the valve body, could never perform this operation. Further, once inserted by this apparatus, the valve will not loosen or leak air, regardless of how the ball is used.

It will be obvious that certain changes and modifications may be made which differ slightly from the two embodiments and method of operation described herein. Therefore, the present invention is intended to cover all such changes and modifications which lie within the true spirit of the invention and within the scope of the subjoined claims.

What is claimed is:

1. An apparatus for inserting a rubber valve into the valve insert cavity of a hollow article comprising, in combination, a cylinder having a piston operable therein, a piston rod connected at one end to said piston, a plunger connected to the other end of said piston rod, a tube in which said plunger is operable, the upper portion of said tube having a lateral opening in the side thereof, the lower end of said tube being adapted to receive said hollow article and having a die opening therein, said tube adapted to contain said rubber valve positioned adjacent said die opening through said lateral opening and a quantity of non-compressible liquid also adapted to be inserted above said rubber valve up to the level of said first opening, and means for operating said piston to cause said plunger to contact said non-compressible liquid to force said rubber valve from said tube and through said die opening into said valve insert cavity.

2. An apparatus for inserting a rubber valve into the valve insert cavity of a hollow article comprising, in combination, a tube having a rod operable therein, said rod having a radial bore in contact with said tube and in communication with an axial bore running lengthwise of said rod, said rubber valve adapted to be positioned adjacent the lower end of said rod, a die member positioned below said tube, the lower end of said die member being adapted to receive said hollow article, and means communicating through said tube with said radial bore and axial bore for introducing a non-compressible fluid under pressure above said valve to force said valve through said die member into said valve insert cavity.

3. An apparatus for inserting a rubber valve into the valve insert cavity of a hollow article comprising, in combination with a C-shaped member, a rod operable within the upper leg of said member, said rod having an actuating means affixed to the top thereof, a radial bore in contact with said upper member and in communication with an axial bore running lengthwise of said rod, said bore being adapted to have a rubber valve positioned centrally of said axial bore at the lower end of said rod, a die member located within the lower leg of said C-shaped member centrally of said rod, the lower end of said die member being adapted to receive said hollow article, and water under pressure means communicating through said upper member with said radial bore and axial bore to force said rubber valve through said die member into said valve insert cavity.

4. An apparatus for inserting rubber valves into hollow articles having a valve insert cavity, comprising, in combination, a first member having a piston reciprocable therein, a second member below said first member and having a die and die orifice axially aligned with said piston, said die being adapted to receive said hollow article, said first and second members being spaced to provide access for positioning said valve between said piston and die orifice, and means including movable parts associated with said piston for applying a non-compressible fluid under pressure above said valve to force said valve through said die orifice into the valve insert cavity of said article.

References Cited in the file of this patent
UNITED STATES PATENTS

| | | |
|---|---|---|
| 583,438 | Hatch | May 25, 1897 |
| 610,594 | Whitbeck | Sept. 13, 1898 |
| 864,226 | Blodgett | Aug. 27, 1907 |
| 2,434,832 | Bruun | Jan. 20, 1948 |
| 2,671,949 | Welton | Mar. 16, 1954 |
| 2,690,001 | Cowles | Sept. 28, 1954 |